US012769117B2

(12) United States Patent
Abe et al.

(10) Patent No.: US 12,769,117 B2
(45) Date of Patent: Oct. 20, 2026

(54) DISPLAY DEVICE, VIRTUAL IMAGE DISPLAY DEVICE, AND MOVABLE BODY

(71) Applicant: Nippon Seiki Co., Ltd., Niigata (JP)

(72) Inventors: Junka Abe, Niigata (JP); Satoru Koyama, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 293 days.

(21) Appl. No.: 18/397,652

(22) Filed: Dec. 27, 2023

(65) Prior Publication Data

US 2024/0219717 A1 Jul. 4, 2024

(30) Foreign Application Priority Data

Dec. 28, 2022 (JP) ................................ 2022-211420

(51) Int. Cl.
*G02B 27/01* (2006.01)

(52) U.S. Cl.
CPC ................................ *G02B 27/0101* (2013.01)

(58) Field of Classification Search
None
See application file for complete search history.

(56) References Cited

U.S. PATENT DOCUMENTS

2002/0084950 A1* 7/2002 Aoki .................. G02B 27/0101 345/7
2017/0336628 A1* 11/2017 Kim ....................... B60K 35/60
2023/0367120 A1* 11/2023 Murata ................ B60K 35/231

FOREIGN PATENT DOCUMENTS

WO 2015/093294 A1 6/2015
WO WO-2016136407 A1 * 9/2016 ............. B60K 35/26

* cited by examiner

*Primary Examiner* — Shan Liu
(74) *Attorney, Agent, or Firm* — Rimon P.C.

(57) ABSTRACT

A display device is provided with a display unit which includes a display surface that emits display light, and emits central display light in an emission direction that is non-perpendicular to the display surface; and a prism which is provided on the display surface, includes an incidence surface on which the display light is incident and an emitting surface which emits the display light, and has a thickness which is gradually increased in the emission direction. In the prism, a vertex of the emitting surface is positioned to be deviated from an immediately above region, which is located immediately above the incidence surface, toward the emission direction side.

6 Claims, 8 Drawing Sheets

DISPLAY DEVICE, VIRTUAL IMAGE DISPLAY DEVICE, AND MOVABLE BODY

This application claims the benefit of Japanese Patent Application No. 2022-211420, filed on Dec. 28, 2022, the entire disclosure of which Application is incorporated by reference herein.

TECHNICAL FIELD

The present invention relates to a display device, a virtual image display device, and a movable body.

BACKGROUND ART

Patent Document 1 discloses configurations of a display device, a virtual image display device, and a movable body of conventional art. Patent Document 1 discloses, for example, in paragraph 0026 and FIG. 7, etc., a virtual image display device as a head-up display (100) provided in a movable body (a vehicle). Particularly, the virtual image display device is provided with a display device as a liquid crystal display device (11).

PRIOR ART DOCUMENT

Patent Document

Patent Document 1: WO 2015/93294

SUMMARY OF INVENTION

Technical Problem

In particular, the liquid crystal display device (11) is provided with a triangular prism (41, 42). Such a configuration in which a prism is provided on a display surface of a display device causes the structure to become more complicated as compared to a configuration in which no prism is provided, and thus, a manufacturing process is made complicated and the difficulty in manufacturing has been increased.

Hence, an object of the present invention is to provide, in light of the problem mentioned above, a display device with improved manufacturability even though the display device is provided with a prism, and also a virtual image display device and a movable body.

Solution to Problem

In order to achieve the above object, a display device according to the present invention is provided with: a display which includes a display surface that emits display light, and emits central display light in an emission direction that is non-perpendicular to the display surface; and a prism which is provided on the display surface, includes an incidence surface on which the display light is incident and an emitting surface which emits the display light, and has a thickness which is gradually increased in the emission direction, in which in the prism, a vertex of the emitting surface is positioned to be deviated from an immediately above region, which is located immediately above the incidence surface, toward the emission direction side.

In order to achieve the above object, a virtual image display device according to the present invention is provided with the display device described above, and displays a virtual image by projecting the display light onto a projection target member.

In order to achieve the above object, a movable body according to the present invention is provided with the virtual image display device described above, and further includes a windshield or a combiner as the projection target member.

DESCRIPTION OF EMBODIMENTS

Figure 1:
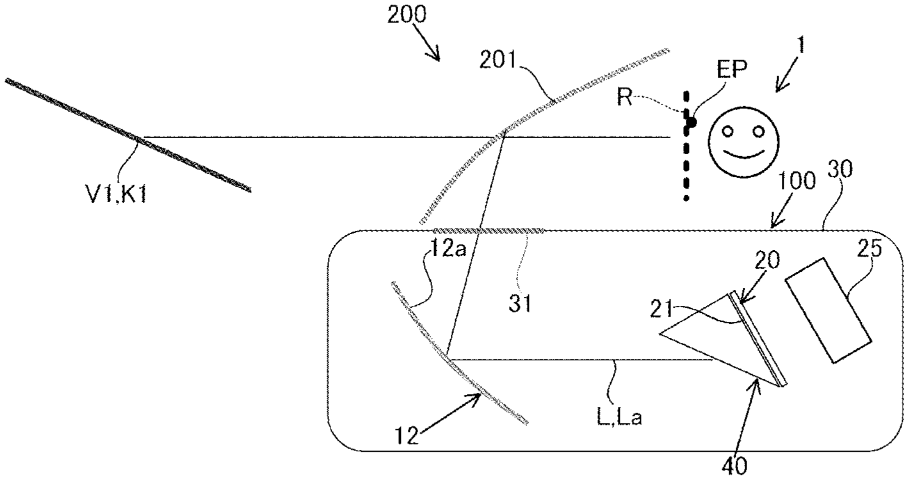
FIG. 1 is a schematic view of a head-up display device according to an embodiment of the present disclosure.

A display device, a virtual image display device, and a movable body according to a first embodiment of the present disclosure will be described with reference to the drawings. As illustrated in FIG. 1, a head-up display device 100 (an example of a virtual image display device) is mounted in a dashboard of a vehicle 200 (an example of a movable body). The head-up display device 100 projects display light L onto a windshield 201, which is an example of a projection target member, thereby displaying a virtual image V1 including vehicle information. When a viewpoint EP of a viewer 1 is within a visible region R, the virtual image V1 is enabled to be visually recognized by the viewer 1. The virtual image V1 is displayed within a virtual image display virtual region K1. The virtual image display virtual region K1 is formed by an unsubstantial flat surface or curved surface.

Figure 2:
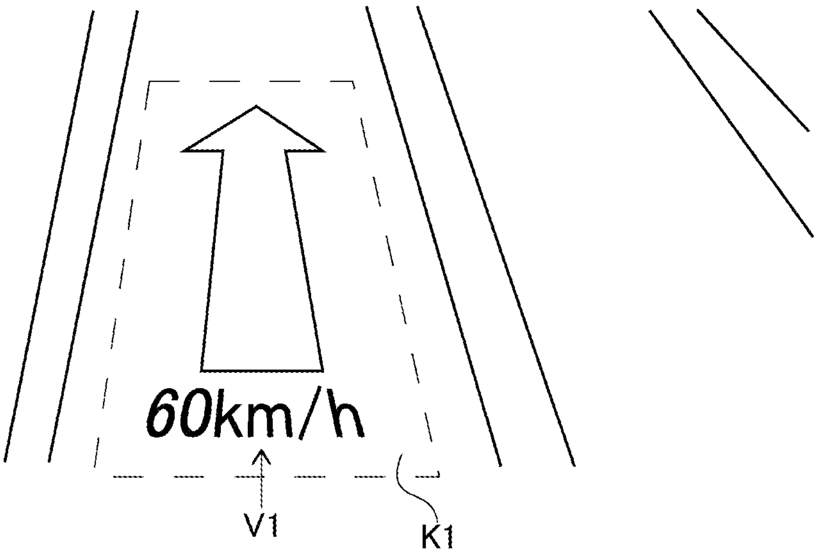
FIG. 2 is a diagram illustrating a virtual image superimposed on the actual scenery according to an embodiment of the present disclosure.

As illustrated in FIG. 2, the virtual image display virtual region K1 extends along the road surface. Here, extending along the road surface means that the virtual image display virtual region K1 lies at an angle of less than ±45° with respect to a horizontal direction. In the present example, the virtual image display virtual region K1 is inclined more upward as the virtual image display virtual region K1 gets farther away from the viewer 1.

As illustrated in FIG. 2, the virtual image V1 is displayed such that the virtual image V1 is along the road surface, which is the actual scenery, when viewed from the viewer 1. The virtual image V1 includes information associated with the road surface, more specifically, symbolic information such as a route guidance arrow, for example. In addition, the virtual image V1 includes character information such as a vehicle speed or sign information.

Characters include numbers, alphabets, hiragana, katakana, kanji, etc. Other than the above, the virtual image V1 may include an icon indicating a structural object standing on the ground, such as buildings or trees.

Next, a configuration of the head-up display device 100 will be described.

As illustrated in FIG. 1, the head-up display device 100 includes a concave mirror 12, which is an optical relay, a display unit 20, a control portion 25, a case 30, and a prism 40.

Note that the display unit 20 and the prism 40 are also configured as an example of a display device D.

The case 30 is formed in a box shape by a light-shielding resin or metal. The concave mirror 12, the display unit 20, and the prism 40 are accommodated within the case 30. The case 30 includes a window portion 31 made of a light-transmissive member that transmits the display light L produced in the internal space of the case 30 toward the windshield 201.

The display unit 20 includes a display surface 21 which radiates the display light L representing an image. The display unit 20 may be of a type including a liquid crystal panel and an illumination device, or of a type including a reflective display element such as a digital micromirror device (DMD) element and a projector. The display surface 21 faces downward toward the front of the vehicle 200. Images displayed on the display surface 21 are subjected to distortion correction (warping) to correct a distortion of the virtual image V1 that is visually recognized by the viewer 1. The display surface 21 is inclined relative to an optical axis center La (i.e., a light beam connecting the center of the display surface 21 and the center of the visible region R, also referred to as central display light) of the display light L. The optical axis center La is positioned at the center of the transverse section of the beams of the display light L. Beams of the display light L and the optical axis center La are emitted in an emission direction which is non-perpendicular to the display surface 21.

The control portion 25 includes a central processing unit (CPU), a graphics display controller (GDC), a read-only memory (ROM), and a random-access memory (RAM), etc. The control portion 25 acquires information such as the vehicle speed and route guidance externally, and generates an image to be displayed on the display surface 21 on the basis of the aforementioned kinds of information.

The prism 40 is provided on the display surface 21, and the display light L emitted from the display surface 21 is transmitted therethrough. The prism 40 will be described in detail later.

As illustrated in FIG. 2, the concave mirror 12 includes a reflection surface 12*a* which is curved in a concave shape along a height direction and a width direction of the vehicle. The concave mirror 12 reflects the display light L transmitted through the prism 40 toward the windshield 201. The concave mirror 12 reflects the display light L from the display surface 21 toward the windshield 201 such that the display light L is enlarged. The reflection surface 12*a* of the concave mirror 12 faces upward toward the rear of the vehicle 200. The concave mirror 12 has the function of suppressing a distortion of the virtual image caused by the reflection at the windshield 201.

Figure 3:
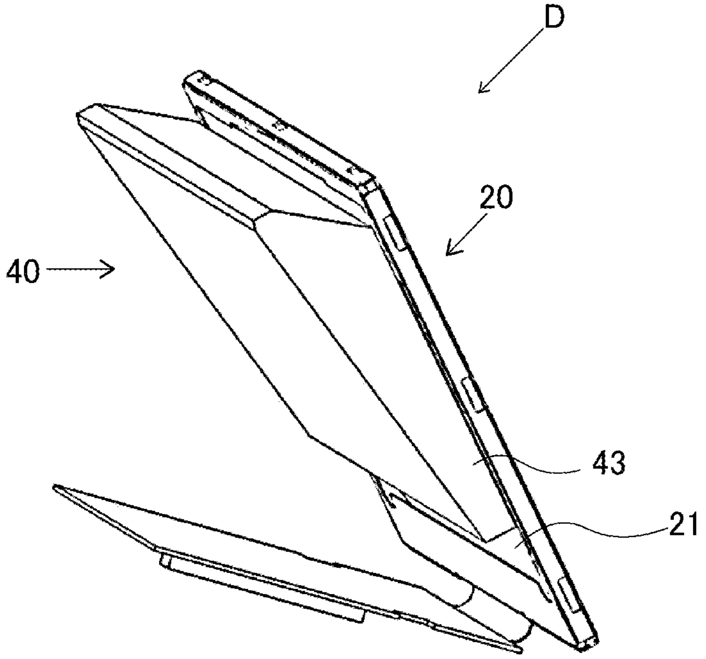
FIG. 3 is a perspective view of a prism and a display unit according to an embodiment of the present disclosure.
Figure 4:
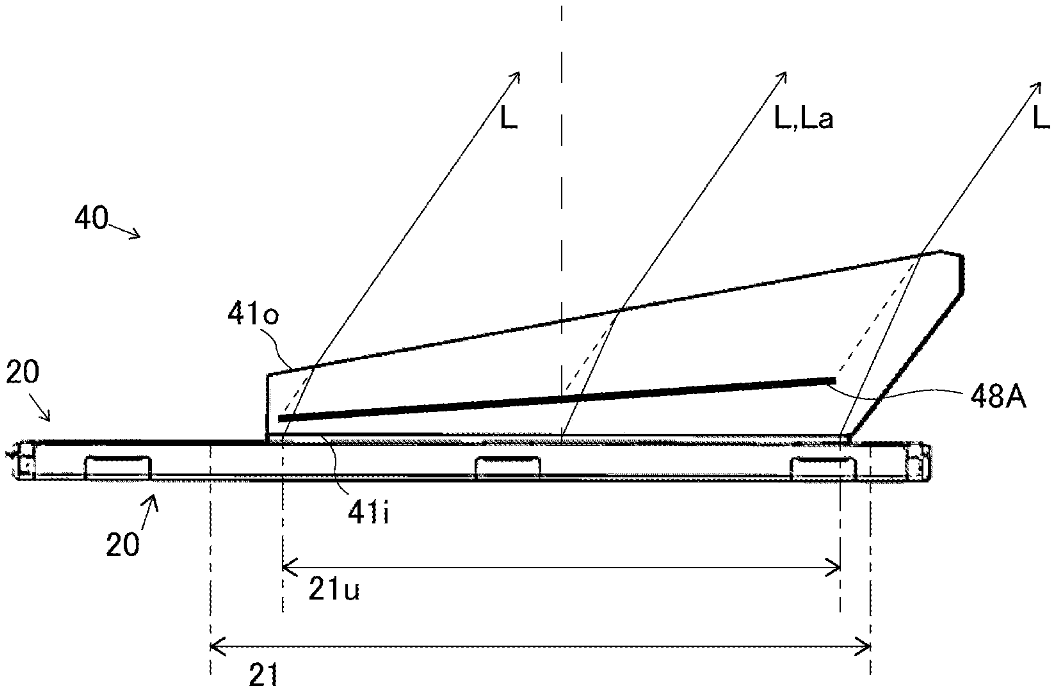
FIG. 4 is a side view of a prism and a display unit according to an embodiment of the present disclosure.
Figure 5:
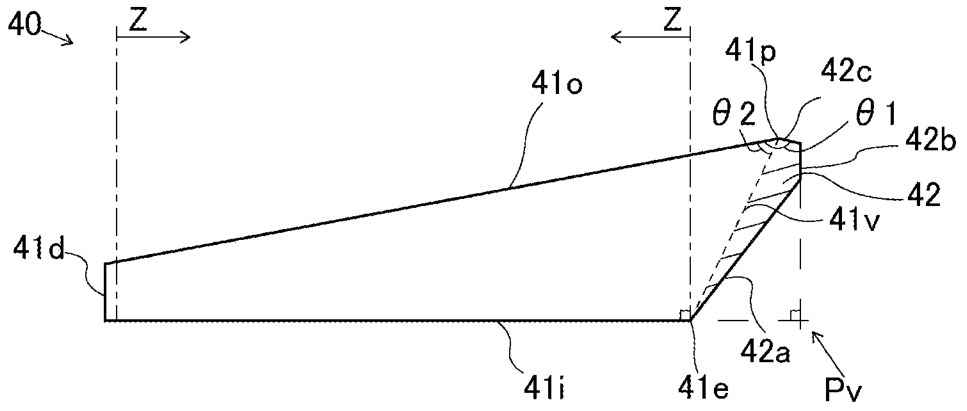
FIG. 5 is a side view of a prism according to an embodiment of the present disclosure.

Next, a configuration of the prism 40 will be described. As illustrated in FIGS. 3, 4, and 5, the prism 40 is made of a material having a refractive index n which is higher than that of air (n=1), more specifically, glass or a transparent optical resin, for example. The transparent optical resin includes, for example, an acrylic resin and a cyclic olefin-based resin. The prism 40 is formed in a wedge shape that covers the display surface 21. In the present example, the display surface 21 has a rectangular shape that is long in the vehicle width direction, and the prism 40 has a polygonal columnar shape that is long in the vehicle width direction.

As illustrated in FIG. 4, the prism 40 forms a virtual display plane 48A therein.

The virtual display plane 48A refers to an apparent position of the display surface 21, which is the original display plane. That is, while visual recognition of the display surface 21 is performed as the display light L which has passed through the prism 40 is perceived at the viewpoint EP, the visual recognition at this time is affected by the refractive index n of the prism 40. Therefore, it appears to the viewer as if the display surface 21 exists at the virtual display plane 48A. For example, in the present embodiment, the display surface 21 appears to exist at the virtual display plane 48A by the effect of the shape of the prism 40.

The prism 40 includes an incidence surface 41*i*, which is positioned to be opposed to the display surface 21 and on which display light from the display surface 21 is incident, and an emitting surface 41*o*, which is positioned on the opposite side of the incidence surface 41*i* and emits the incident display light L. The incidence surface 41*i* is formed in a rectangular plane shape. The incidence surface 41*i* of the prism 40 may be fixed to the display surface 21 by optical bonding, or the prism 40 may be supported by a support mechanism that is not illustrated.

The incidence surface 41*i* may be formed over the entire display surface 21. However, in the present embodiment, as illustrated in FIG. 4, the incidence surface 41*i* is provided to correspond to a use range 21*u* of the display surface 21. The use range 21*u* refers to a range of the display surface 21 in which the display may be performed to form the virtual image V1. The use range 21*u* may be generated, for example, when the outer shape of the display surface 21 does not match with the outer shape of the virtual image V1. When the incidence surface 41*i* is formed to correspond to only the use range 21*u*, the incidence surface 41*i* formed in this way is preferable since an increase in the size of the prism 40 can be prevented.

The emitting surface 41*o* is formed in such a way that the thickness of the prism 40 is gradually increased in the emission direction of the display light L. The position of the virtual display plane 48A is determined according to how far the display light L has traveled from the incidence surface 41*i* to the emitting surface 41*o*. Specifically, in FIG. 4, a distance between the virtual display plane 48A and the display surface 21 is small on the left side portion in the figure at which the thickness of the prism 40 is small. In contrast, a distance between the virtual display plane 48A and the display surface 21 is large on the right side portion in the figure at which the thickness of the prism 40 is large. Due to this effect, as an angle that is greater than the actual angle of the display surface 21 is imparted to the virtual display plane 48A, it is possible to make the inclination of the virtual image V1 larger. When the inclination of the virtual image V1 is large, the viewer 1 easily feels a sense of unity between the virtual image V1 and the road surface, and the visibility is enhanced. As described above, reducing the angle of the display surface 21 by the effect of the prism is the viewing angle performance of the display unit 20 is relatively low As illustrated in FIG. 5, the prism 40 includes, more specifically, a surface 41*d*, a vertex 41*p*, and a protruding portion 42.

The vertex 41*p* corresponds to a place of the emitting surface 41*o* that is most distant in terms of the normal vector components of the incidence surface 41*i*. The vertex 41*p* is positioned to be deviated from an immediately above region Z, which is located immediately above the incidence surface 41*i*, toward the side in the emission direction of the display light L. It can also be said that the vertex 41*p* is positioned on the outer side of the immediately above region Z.

A display device provided with a prism forming the vertex 41*p* which is configured as described above can be easily manufactured. This is because, when a triangular prism as disclosed in Patent Document 1 described above is applied to the display device of the present embodiment, the prism is enlarged. Specifically, in a conventional prism (e.g., a triangular prism or the like), the prism is formed from a vertex portion to a surface along a perpendicular line drawn downward in the direction of an incidence surface, and this surface and the incidence surface form a right angle. Therefore, when the vertex 41*p* exists at a position deviated from a perpendicular region of the incidence surface 41*i*, as in the present embodiment, the prism is unnecessarily enlarged. Meanwhile, if the prism is configured like the prism 40 of the present disclosure, it is possible to prevent unnecessary enlargement of the prism toward the outer side from the incidence surface. Thus, as a result of reduction in the manufacturing cost and improvement of the handling properties, it is possible to improve manufacturability.

The prism 40 includes the protruding portion 42. The protruding portion 42 is a portion which is further projected toward the outer side of the prism 40 (i.e., the emission direction side) with respect to a virtual side surface 41*v*, which connects the vertex 41*p* and an end portion 41*e* of the incidence surface 41*i*. The virtual side surface 41*v* may be a surface formed downward from the vertex 41*p* toward the incidence surface 41*i* along a surface which is substantially parallel to the display light L.

A surface 42*c* is a surface formed adjacent to the vertex 41*p* as the outer shape of the protruding portion 42. For example, the surface 42*c* is formed in a direction of opening greatly toward the lower outer side from the vertex 41*p* as a starting point. The surface 42*c* is also adjacent to the emitting surface 41*o*, whereby a vertex angle θ1 is formed between the surface 42*c* and the emitting surface 41*o*. The vertex angle θ1 is formed to be more obtuse than a virtual angle θ2 formed at the vertex 41*p* when there is no protruding portion 42. The virtual angle θ2 is formed by the emitting surface 41*o* and the virtual side surface 41*v*, specifically. In the prism 40 formed in this way, the shape in the vicinity of the vertex 41*p*, which tends to be formed at a relatively acute angle, is enabled to be easily formed into a shape that is more obtuse. Consequently, cracks which may be formed at the time of manufacturing are less likely to occur. By making it possible to suppress occurrence of cracks which may be formed at the time of manufacturing, improving the manufacturability of the prism 40, and moreover, the display device, is achieved.

A surface 42*b* is a surface formed on the outermost side as the outer shape of the protruding portion. The surface 42*b* is a surface perpendicular to the incidence surface 41*i*. Extension lines of the surface 42*b* and the incidence surface 41*i* intersect each other at a right angle at a virtual point Pv. A configuration in which a perpendicular surface (the surface 42*b*) is formed in the protruding portion 42 in this way improves the manufacturability of the display device.

Specifically, the prism 40 is provided on the display surface 21 by being adhesively attached to the display surface 21, for example. In doing so, the prism 40 is adhesively attached by, for example, pressing the emitting surface 41*o* that is inclined relative to the incidence surface 41*i*, which is an adhesive surface. At the time of the pressing, the prism 40 receives a force which makes the prism 40 be displaced toward the protruding portion 42 side by the effect of the inclination. At this time, in a conventional prism which does not have a protruding portion or a perpendicular surface, a vertex or the like comes into contact with a jig at the time of manufacturing. In contrast, with the prism 40 configured such that a jig comes into contact with the protruding portion 42 or the surface 42*b* prior to the vertex, it is possible to reduce the possibility of cracks occurring at a place that is functionally important for display even if the prism 40 comes into contact with the jig. In addition, in the prism 40 including the surface 42*b*, which is the perpendicular surface, the surface 42*b* is intentionally made to abut against a jig at the time of installation, thereby facilitating the positioning.

A surface 42*a* is a surface formed to connect the surface 42*b* and the end portion 41*e*.

A surface 41*d* is a surface formed to connect the incidence surface 41*i* and the emitting surface 41*o*. In particular, the surface 41*d* is formed as a perpendicular surface perpendicular to the incidence surface 41*i*. As the surface 41*d*, which is the perpendicular surface, abuts against a jig, positioning can be easily performed.

The surface 41*d* is formed on a side surface opposite to the protruding portion 42. Although not illustrated, it is more preferable if the surface 41*d* is provided such that at least a part of the surface 41*d* is opposed to the surface 42*b*, which is the perpendicular surface, formed in the protruding portion 42. When the surfaces are provided to be opposed to each other, the manufacturability of the display device is further improved. Specifically, the prism 40 in which the perpendicular surfaces, which are at least partially opposed to each other, are formed can be easily handled since the prism 40 allows an assembly worker or an automatic assembly machine to grasp the prism 40 by the opposing portions. Therefore, improving the manufacturability of the display device can be realized.

An example in which the protruding portion 42 is formed by the surfaces and corners as described above is indicated. In particular, it is desirable that all the corners of the protruding portion 42 be formed to have an obtuse angle as illustrated in the drawing.

Further, the shape of the protruding portion 42 has been described mainly on the basis of the side view of FIG. 4, etc. However, in practice, the prism 40 (the protruding portion 42) also forms a corner at the periphery of a side surface 43 illustrated in FIG. 3. As regards the shape of the protruding portion that has been described in detail, the shape as desired need not necessarily be achieved with the aforementioned side surface. In fact, in the embodiment described above, there exists a place where a right-angled shape is formed between the side surface 43 and the protruding portion 42. Angles at such places need not be obtuse. That is, each shape of the protruding portion which is assumed to be desirable may be realized by an outer shape of a cross section according to a plane including at least a normal line of the display surface 21 and the optical axis center La.

Note that although the side surface 43 is also exemplified as a plane in the embodiment described above, the side surface 43 may be a curved surface, an inclined surface, or the like. The corner formed at the periphery of the side surface 43 should preferably have an obtuse angle. Also by this configuration, the manufacturability of the display device is improved.

Advantageous Effects

According to the embodiment described above, the following advantageous effects are achieved.

Firstly, as a first aspect, the display device D is provided with: the display unit 20 which includes the display surface 21 that emits the display light L, and emits central display light in an emission direction that is non-perpendicular to the display surface 21; and the prism 40 which is provided on the display surface 21, includes an incidence surface 41*i* on which the display light L is incident and an emitting surface 41*o* which emits the display light L, and has a thickness which is gradually increased in the emission direction, in which in the prism 40, a vertex of the emitting surface 41*o* is positioned to be deviated from an immediately above region, which is located immediately above the incidence surface 41*i*, toward the emission direction side.

According to this configuration, it is possible to prevent the prism 40 from being unnecessarily enlarged in the volume, and the manufacturability of the display device can be improved.

Secondly, as a second aspect, in the display device D indicated as the first aspect, the prism 40 forms the protruding portion 42 which is further projected toward the emission direction side with respect to the virtual side surface 41*v*, which connects the end portion 41*e* of the incidence surface 41*i* at the emission direction side and the vertex 41*p*, the protruding portion 42 is formed by the surfaces 42*a*, 42*b*, and 42*c* and corners, and of the corners, the vertex angle θ1 formed at the vertex 41*p* is more obtuse than the virtual angle θ2 formed by the virtual side surface 41*v* and the emitting surface 41*o*.

According to this configuration, it becomes easy to form the corner to be formed at the vertex 41*p* to be more obtuse, and the manufacturability of the display device can be improved.

Thirdly, as a third aspect, in the display device D indicated as the second aspect, the surface 42*b*, which is a surface that is most projected toward the emission direction side among the surfaces forming the protruding portion 42, is a perpendicular surface perpendicular to the incidence surface 41*i*.

According to this configuration, positioning of the prism 40 can be easily performed at the time of manufacturing, and the manufacturability of the display device can be improved.

Fourthly, as a fourth aspect, in the display device D indicated as the second aspect, the protruding portion 42 is formed by obtuse-angled corners and surfaces, from the vertex 41*p* to the end portion 41*e*.

According to this configuration, occurrence of cracks of the prism 40 can be suppressed, and the manufacturability of the display device can be improved.

Note that the present disclosure is not limited to the above embodiments and drawings. Modifications (including deletion of structural elements) may be made as appropriate as long as the gist of the present disclosure is not changed. An example of modifications will be described below.

Modification Example

Figure 6:
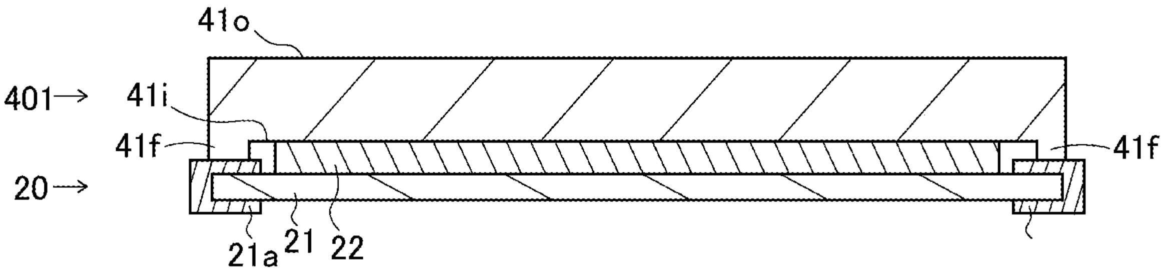
FIG. 6 is a side view of a prism and a display unit according to a modification example of the present disclosure.

The display device may adopt a configuration indicated below. For example, FIG. 6 is a side view of the display device illustrated in FIG. 4 as seen from the left side of the drawing. In particular, in the display device, a prism 401 is applied instead of the prism 40.

In contrast to the prism 40, the prism 401 further includes a leg portion 41*f*. The leg portion 41*f* has a protruding shape protruding from the incidence surface 41*i* toward the display surface 21. The leg portion 41*f* may be formed to be dotted one by one at each of four corners or may be formed as a pair of linear shapes on both sides of the prism, or may be formed in an annular shape or a polygonal shape so as to surround the incidence surface 41*i*.

The leg portion 41*f* abuts against the display unit 20, for example. In a case where the display unit 20 is provided with a bezel 21*a* (a frame body) formed to surround the periphery of the display surface 21, preferably, the leg portion 41*f* should abut against the bezel 21*a*. The bezel 21*a* is formed of a metal or the like which reduces noise, static electricity, and the like, on the display surface 21.

The leg portion 41*f* is formed in such a shape that the thickness of an adhesive 22, which adhesively attaches the display surface 21 and the prism 401 to each other, is kept constant. That is, the leg portion 41*f* is formed so as to keep the relative position of the prism 401 with respect to the display surface 21 constant. The leg portion 41*f* may be formed so as to keep the distance between the display surface 21 and the incidence surface 41*i* constant.

Figure 7:
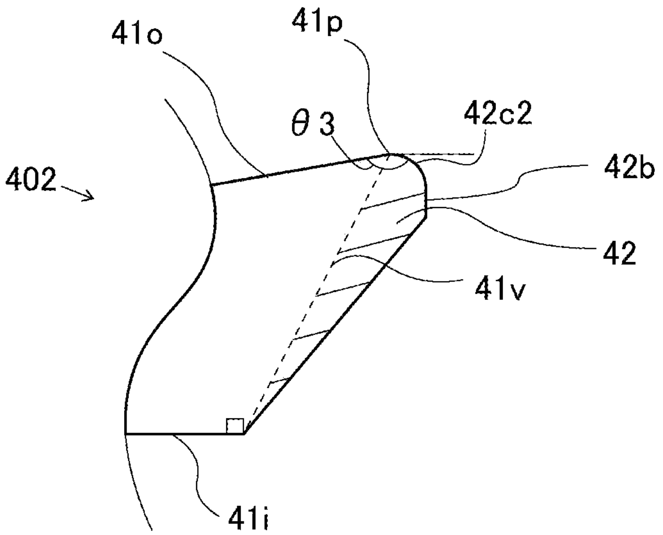
FIG. 7 is a side view of a prism according to a modification example of the present disclosure.

The prism may be a prism 402 illustrated in FIG. 7. In contrast to the prism 40, in the prism 402, the surface 42*c* is configured as a surface 42*c*2.

The surface 42*c*2 has commonality with the surface 42*c* in that the surface 42*c*2 is formed by connecting the emitting surface 41*o* and the surface 42*b*. Meanwhile, the surface 42*c*2 constitutes a curved shape. Further, the surface 42*c*2 is connected to the emitting surface 41*o* at the vertex 41*p* in an indifferentiable angular shape.

In this case, preferably, a vertex angle θ3 formed by the surface of the emitting surface 41*o* and a tangential plane of the surface 42*c*2 should be more obtuse than a virtual angle.

Figure 8:
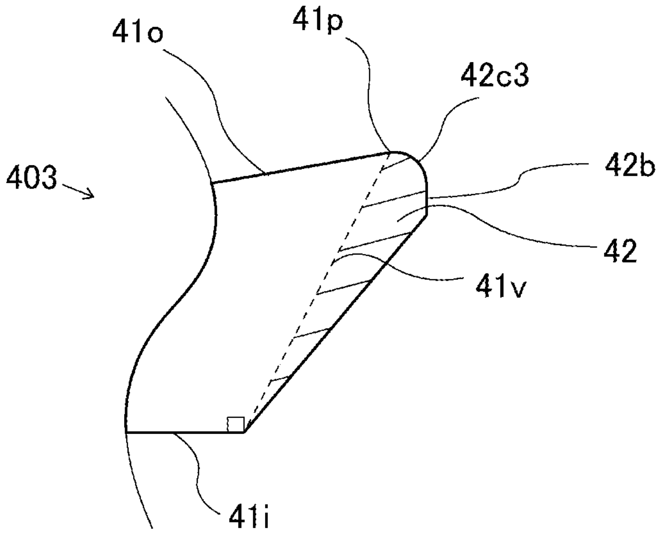
FIG. 8 is a side view of a prism according to a modification example of the present disclosure.

The prism may be a prism 403 illustrated in FIG. 8. In contrast to the prism 40, in the prism 403, the surface 42*c* is configured as a surface 42*c*3.

The surface 42*c*3 is a curved surface formed in a shape that is constantly differentiable from the vertex 41*p* to the surface 42*b*. That is to say, the surface 42*c*3 constitutes a shape that smoothly connects the emitting surface 41*o* and the surface 42*b*.

Even if such a configuration in which no vertex angle is formed is adopted, the manufacturability of the display device is improved as long as the protruding portion is formed by a surface (including a curved surface) and an obtuse-angled corner.

Further, as another modification example, a configuration as described below may be adopted.

Although an example in which the emitting surface 41*o* has a planar shape has been indicated, the emitting surface 41*o* may be a curved surface.

Although an example in which the vertex 41*p* is formed in a linear shape with the apexes being continuous with each other has been indicated, the vertex 41*p* may be formed in a curved shape.

The vertex 41*p* need not necessarily be formed so as to traverse the emitting surface 41*o*.

The end portion 41*e* may be a curved line instead of a straight line.

Other than the above, a partial shape of the prism which is not particularly mentioned may be changed as appropriate.

In each of the above embodiments, the head-up display device 100 is mounted on a vehicle. However, an object on which the head-up display device 100 is mounted is not limited to the above, and the head-up display device 100 may be mounted on a movable body such as an airplane or a ship. Furthermore, the projection target member is not limited to the windshield 201, but may be a dedicated combiner.

Further, beams of the display light L may be crossed within an optical path by the convergence effect of a mirrors or a lens.

Also in this case, the advantageous effect of the present invention is exhibited if the prism and the display unit are configured as appropriate to correspond to the desired form of the virtual image.

For example, when beams of the display light L are to cross once within the optical path in the up-down direction, the prism and the display unit should preferably be provided upside down as compared to the case where the beams of the display light L do not cross each other.

The display light L may be projected by passing through an arbitrary mirror and lens between the display device and the projection target member. The arbitrary mirror may have a shape that is a flat surface, a concave surface, a convex surface, or a free-form surface, and the wavelength characteristic may indicate total reflection or visible light reflection. The arbitrary lens may be a lens in which the shape of the incidence surface and the emitting surface is a flat surface, a concave surface, a convex surface, or a free-form surface, and the wavelength characteristic may indicate total reflection or visible light reflection.

REFERENCE SIGNS LIST

1 Viewer
12 Concave mirror
12*a* Reflection surface
20 Display unit
21 Display surface
21*a* Bezel (an example of a frame body)
21*u* Use range
22 Adhesive
25 Control portion
30 Case
31 Window portion
40 Prism
41*i* Incidence surface
41*o* Emitting surface
41*d* Surface
41*e* End portion
41*v* Virtual side surface
41*p* Vertex
42 Protruding portion
42*a*, 42*b*, 42*c*, 42*c*2, 42*c*3 Surface
43 Side surface
θ1 Vertex angle
θ2 Virtual angle
48A Virtual display plane
100 Head-up display device (an example of a virtual image display device)
200 Vehicle (an example of a movable body)
201 Windshield (an example of a projection target member)
D Display device
L Display light
La Optical axis center
EP Viewpoint
R Visible region
V1 Virtual image
K1 Virtual image display virtual region
Z Immediately above region

The invention claimed is:

1. A display device comprising:

a display unit which includes a display surface that emits display light, and emits central display light in an emission direction that is non-perpendicular to the display surface; and a prism which is provided on the display surface, includes an incidence surface on which the display light is incident and an emitting surface which emits the display light, and has a thickness which is gradually increased in the emission direction, wherein in the prism, a vertex of the emitting surface is positioned to be deviated from an immediately above region, which is located immediately above the incidence surface, toward the emission direction side, wherein the prism forms a protruding portion which is further expanded toward the emission direction side with respect to a virtual side surface, which connects an end portion of the incidence surface at the emission direction side and the vertex, wherein the protruding portion is formed by surfaces and corners, and wherein, of the corners, a vertex angle formed at the vertex is more obtuse than an angle formed by the virtual side surface and the emitting surface.

2. The display device according to claim 1, wherein the surface that is most projected toward the emission direction side among the surfaces forming the protruding portion is a perpendicular surface perpendicular to the incidence surface.

3. The display device according to claim 1, wherein the protruding portion is formed by obtuse-angled corners and surfaces, from the vertex to the end portion.

4. The display device according to claim 1, wherein:

the prism is further provided with a leg portion protruding from the incidence surface side; and the leg portion is in contact with the display unit so as to keep a distance between the incidence surface and the display surface constant.

5. The display device according to claim 4, wherein:

the display unit is further provided with a frame body which covers a periphery of the display surface; and the leg portion is in contact with the frame body.

6. A display device comprising:

a display unit which includes a display surface that emits display light, emits central display light in an emission direction that is non-perpendicular to the display surface, and further includes a frame body which covers a periphery of the display surface; and a prism which is provided on the display surface, includes an incidence surface on which the display light is incident and an emitting surface which emits the display light, and has a thickness which is gradually increased in the emission direction, wherein in the prism, a vertex of the emitting surface is positioned to be deviated from an immediately above region, which is located immediately above the incidence surface, toward the emission direction side, the prism further includes a leg portion protruding from the incidence surface side toward the display surface, and the leg portion is in contact with the frame body so as to keep a distance between the incidence surface and the display surface constant.

* * * * *